US011344909B2

(12) United States Patent
Saine et al.

(10) Patent No.: US 11,344,909 B2
(45) Date of Patent: May 31, 2022

(54) SYSTEM AND METHOD FOR ACTIVE ADHESIVE RECIRCULATION CONTROL

(71) Applicant: NORDSON CORPORATION, Westlake, OH (US)

(72) Inventors: Joel E. Saine, Dahlonega, GA (US); John W. Fritz, Roswell, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/935,402

(22) Filed: Jul. 22, 2020

(65) Prior Publication Data
US 2020/0346243 A1 Nov. 5, 2020

Related U.S. Application Data

(62) Division of application No. 15/697,711, filed on Sep. 7, 2017, now Pat. No. 10,758,934.
(Continued)

(51) Int. Cl.
*B05C 11/10* (2006.01)
*B05C 5/02* (2006.01)
(Continued)

(52) U.S. Cl.
CPC ...... *B05C 11/1007* (2013.01); *B05B 11/3049* (2013.01); *B05B 15/65* (2018.02); *B05C 5/02* (2013.01); *B05C 5/0225* (2013.01); *B05C 5/0279* (2013.01); *B05C 11/025* (2013.01); *B05C 11/1026* (2013.01); *B05C 11/1042* (2013.01); *B05C 11/1044* (2013.01); *B05C 19/008* (2013.01); *B01F 25/54* (2022.01);
(Continued)

(58) Field of Classification Search
USPC .................. 118/683, 692, 663, 695, 696
See application file for complete search history.

(56) References Cited

U.S. PATENT DOCUMENTS 3,518,967 A 7/1970 Horrocks
4,687,137 A 8/1987 Boger et al.
(Continued)

FOREIGN PATENT DOCUMENTS

CN 1378884 A 11/2002
CN 2644737 Y 9/2004
(Continued)

OTHER PUBLICATIONS (IPEA/408) Written opinion under Chapter II dated Aug. 3, 2018 for WO Application No. PCT/US17/050417.
(Continued)

*Primary Examiner* — Yewebdar T Tadesse
(74) *Attorney, Agent, or Firm* — BakerHostetler

(57) ABSTRACT

A method for controlling a recirculation pump assembly is disclosed. The method includes receiving a process-dependent characteristic and determining a recirculation flow rate of adhesive that flows to the recirculation pump assembly based on the process-dependent characteristic. The method further includes determining a recirculation pump speed of the recirculation pump assembly for pumping the adhesive to a supply channel using the recirculation flow rate, and adjusting an operating speed of the recirculation pump assembly to match the recirculation pump speed. A system and storage device for performing the above method are also disclosed.

20 Claims, 9 Drawing Sheets

Related U.S. Application Data

(60) Provisional application No. 62/385,238, filed on Sep. 8, 2016.

(51) Int. Cl.

| | | |
|---|---|---|
| *B05B 15/65* | (2018.01) | |
| *B05B 11/00* | (2006.01) | |
| *B05C 11/02* | (2006.01) | |
| *B05C 19/00* | (2006.01) | |
| *F04C 2/18* | (2006.01) | |
| *F04C 11/00* | (2006.01) | |
| *B01F 25/54* | (2022.01) | |
| *B01F 25/62* | (2022.01) | |
| *F04B 49/20* | (2006.01) | |
| *F04D 15/00* | (2006.01) | |
| *B05B 9/04* | (2006.01) | |
| *B05C 5/00* | (2006.01) | |
| *B32B 37/12* | (2006.01) | |
| *F04C 14/08* | (2006.01) | |

(52) U.S. Cl.
CPC ............. *B01F 25/62* (2022.01); *B05B 9/0403* (2013.01); *B05C 5/001* (2013.01); *B05C 5/027* (2013.01); *B05C 5/0258* (2013.01); *B05C 11/1002* (2013.01); *B05C 11/1039* (2013.01); *B32B 37/1284* (2013.01); *F04B 49/20* (2013.01); *F04C 2/18* (2013.01); *F04C 11/001* (2013.01); *F04C 14/08* (2013.01); *F04D 15/0066* (2013.01)

(56) References Cited

U.S. PATENT DOCUMENTS

| | | |
|---|---|---|
| 5,228,594 A | 7/1993 | Aslin |
| 5,236,641 A | 8/1993 | Allen et al. |
| 5,389,151 A | 2/1995 | Fort |
| 5,409,642 A | 4/1995 | Allen et al. |
| 5,458,291 A | 10/1995 | Brusko et al. |
| 5,620,315 A | 4/1997 | Pfuhler |
| 5,632,938 A | 5/1997 | Buehning, Sr. |
| 5,636,790 A | 6/1997 | Brusko et al. |
| 5,727,933 A | 3/1998 | Laskaris et al. |
| 5,862,986 A | 1/1999 | Bolyard et al. |
| 6,089,413 A | 7/2000 | Riney et al. |
| 6,210,141 B1 | 4/2001 | Allen |
| 6,296,463 B1 | 10/2001 | Allen |
| 6,422,428 B1 | 7/2002 | Allen et al. |
| 6,517,891 B1 | 2/2003 | Estelle et al. |
| 6,607,104 B2 | 8/2003 | McGuffey |
| 6,688,498 B1 | 2/2004 | McGuffey |
| 7,611,071 B2 | 11/2009 | Bolyard et al. |
| 7,699,243 B2 | 4/2010 | Starke |
| 7,878,375 B2 | 2/2011 | Yajima |
| 7,908,997 B2 | 3/2011 | Lessley et al. |
| 8,220,725 B2 | 7/2012 | Gressett et al. |
| 8,445,061 B2 | 5/2013 | McGuffey |
| 8,561,656 B2 | 10/2013 | Eginton et al. |
| 9,126,222 B2 | 9/2015 | McGuffey |
| 9,168,554 B2 | 10/2015 | Saine et al. |
| 9,415,415 B1 | 8/2016 | Jones |
| 9,427,766 B2 | 8/2016 | Varga |
| 9,573,159 B2 | 2/2017 | McGuffey |
| 9,889,599 B2 | 2/2018 | Ayers |
| 9,925,552 B2 | 3/2018 | Saine |
| 2001/0024618 A1 | 9/2001 | Winmill |
| 2002/0102324 A1 | 8/2002 | Groleau |
| 2002/0139818 A1 | 10/2002 | McGuffey |
| 2003/0062384 A1 | 4/2003 | McGuffey |
| 2003/0098317 A1 | 5/2003 | McGuffey |
| 2004/0099752 A1 | 5/2004 | Boger |
| 2004/0124251 A1 | 7/2004 | Gressett et al. |
| 2004/0159672 A1 | 8/2004 | Auber et al. |
| 2005/0230423 A1 | 10/2005 | Riney et al. |
| 2005/0242108 A1 | 11/2005 | Harris et al. |
| 2005/0274317 A1 | 12/2005 | De et al. |
| 2006/0182887 A1 | 8/2006 | Miller |
| 2007/0246576 A1 | 10/2007 | Bolyard et al. |
| 2008/0023489 A1 | 1/2008 | Lessley |
| 2008/0135650 A1 | 6/2008 | Starke |
| 2008/0169362 A1 | 7/2008 | Kwan et al. |
| 2008/0245298 A1 | 10/2008 | Ayers |
| 2009/0214372 A1 | 8/2009 | McGuffey et al. |
| 2009/0242591 A1 | 10/2009 | Gressett et al. |
| 2009/0266844 A1 | 10/2009 | McGuffey |
| 2011/0014369 A1 | 1/2011 | McGuffey |
| 2011/0052811 A1 | 3/2011 | McGuffey |
| 2011/0100505 A1 | 5/2011 | Jendrichowski et al. |
| 2012/0048447 A1 | 3/2012 | Burmester et al. |
| 2012/0187145 A1 | 7/2012 | Gould et al. |
| 2013/0108494 A1 | 5/2013 | Varga |
| 2014/0161504 A1 | 6/2014 | Duquet et al. |
| 2015/0017332 A1 | 1/2015 | Zolli et al. |
| 2015/0125616 A1 | 5/2015 | Trabelsi et al. |
| 2015/0190837 A1 | 7/2015 | Burmester et al. |
| 2015/0352588 A1 | 12/2015 | Lessley et al. |
| 2016/0256889 A1 | 9/2016 | Jones |
| 2016/0303597 A1 | 10/2016 | McGuffey |
| 2017/0072624 A1 | 3/2017 | Ayers |
| 2017/0097019 A1 | 4/2017 | Afshari |
| 2017/0146035 A1 | 5/2017 | Afshari |
| 2018/0065133 A1 | 3/2018 | Saine |
| 2018/0065137 A1 | 3/2018 | Saine |
| 2018/0065139 A1 | 3/2018 | Saine |
| 2018/0065140 A1 | 3/2018 | Saine et al. |
| 2018/0065142 A1 | 3/2018 | Saine |
| 2018/0252213 A1 | 9/2018 | Afshari |
| 2018/0266415 A1 | 9/2018 | Afshari |
| 2018/0291895 A1 | 10/2018 | Afshari |
| 2019/0299237 A1 | 10/2019 | Scharen et al. |

FOREIGN PATENT DOCUMENTS

| | | |
|---|---|---|
| CN | 1716023 | 1/2006 |
| CN | 200999361 Y | 1/2008 |
| CN | 101185923 A | 5/2008 |
| CN | 101641164 A | 2/2010 |
| CN | 101711186 A | 5/2010 |
| CN | 102686321 A | 9/2012 |
| CN | 202517128 U | 11/2012 |
| CN | 202725435 U | 2/2013 |
| CN | 103089613 A | 5/2013 |
| CN | 103384569 A | 11/2013 |
| CN | 103732100 A | 4/2014 |
| CN | 103917300 A | 7/2014 |
| CN | 204412579 U | 6/2015 |
| DE | 4121792 A1 | 1/1993 |
| DE | 202004001480 U1 | 4/2004 |
| EP | 1442798 A2 | 8/2004 |
| EP | 1946846 A2 | 7/2008 |
| EP | 2289633 A2 | 3/2011 |
| EP | 3064279 A1 | 9/2016 |
| EP | 3064280 A1 | 9/2016 |
| JP | 08-505810 A | 6/1996 |
| JP | 09-173917 A | 7/1997 |
| JP | 09-508578 A | 9/1997 |
| JP | 10-034056 A | 2/1998 |
| JP | 2002-512121 A | 4/2002 |
| JP | 2002-361123 A | 12/2002 |
| JP | 2003-211059 A | 7/2003 |
| JP | 2004-255374 A | 9/2004 |
| JP | 2008-110343 A | 5/2008 |
| JP | 2009-028727 A | 2/2009 |
| JP | 2010-517764 A | 5/2010 |
| JP | 2010-523317 A | 7/2010 |
| JP | 2012-533412 A | 12/2012 |
| JP | 2013-503033 A | 1/2013 |
| JP | 2013-096415 A | 5/2013 |
| JP | 2019-534780 A | 12/2019 |
| KR | 20-0441757 Y1 | 9/2008 |
| WO | 93/05212 A2 | 3/1993 |
| WO | 94/23209 A1 | 10/1994 |

(56) References Cited

FOREIGN PATENT DOCUMENTS

| WO | 99/54044 A1 | 10/1999 |
| WO | 99/54055 A1 | 10/1999 |
| WO | 2007/084891 A2 | 7/2007 |
| WO | 2011/008390 A1 | 1/2011 |
| WO | 2011/025603 A1 | 3/2011 |
| WO | 2015/057729 A2 | 4/2015 |

OTHER PUBLICATIONS (IPEA/409) International Preliminary Report on Patentability Chapter II or (IB/373) International Preliminary Report on Patentability Chapter I dated Mar. 21, 2019 for WO Application No. PCT/US17/050368.
(IPEA/409) International Preliminary Report on Patentability Chapter II or (IB/373) International Preliminary Report on Patentability Chapter I dated Mar. 21, 2019 for WO Application No. PCT/US17/050373.
(IPEA/409) International Preliminary Report on Patentability Chapter II or (IB/373) International Preliminary Report on Patentability Chapter I dated Mar. 21, 2019 for WO Application No. PCT/US17/050380.
(IPEA/409) International Preliminary Report on Patentability Chapter II or (IB/373) International Preliminary Report on Patentability Chapter I dated Mar. 21, 2019 for WO Application No. PCT/US17/050406.
(IPEA/409) International Preliminary Report on Patentability Chapter II or (IB/373) International Preliminary Report on Patentability Chapter I dated Mar. 21, 2019 for WO Application No. PCT/US17/050509.
English Translation of International Preliminary Report on Patentability Chapter II or English Translation of International Preliminary Report on Patentability Chapter I dated Dec. 13, 2018 for WO Application No. PCT/US17/050417.
English Translation of International Preliminary Report on Patentability Chapter II or English Translation of International Preliminary Report on Patentability Chapter I dated Mar. 21, 2019 for WO Application No. PCT/US17/050368.
English Translation of International Preliminary Report on Patentability Chapter II or English Translation of International Preliminary Report on Patentability Chapter I dated Mar. 21, 2019 for WO Application No. PCT/US17/050373.
International Patent Application No. PCT/US2017/050406; Int'l Search Report and the Written Opinion; dated Mar. 19, 2018; 19 pages.
ISA/206—Invitation to Pay Additional Fees dated Jan. 5, 2018 for WO Application No. PCT/US17/50406.
ISA/220—Notification of Transmittal or Search Report and Written Opinion of the ISA, or the Declaration dated Dec. 20, 2017 for WO Application No. PCT/US17/050368.
ISA/220—Notification of Transmittal or Search Report and Written Opinion of the ISA, or the Declaration dated Dec. 20, 2017 for WO Application No. PCT/US17/050373.
ISA/220—Notification of Transmittal or Search Report and Written Opinion of the ISA, or the Declaration dated Jan. 8, 2018 for WO Application No. PCT/US17/050380.

SYSTEM AND METHOD FOR ACTIVE ADHESIVE RECIRCULATION CONTROL

CROSS REFERENCE TO RELATED APPLICATIONS

This application is a divisional of U.S. patent application Ser. No. 15/697,711, filed Sep. 7, 2017, which claims the benefit of U.S. Patent App. No. 62/385,238, filed Sep. 8, 2016, the disclosures of which are hereby incorporated by reference herein in their entireties.

TECHNICAL FIELD

The present invention relates to a system for controlling the operation of a recirculation pump assembly, as well as the method of operation.

BACKGROUND

Typical applicators for dispensing adhesive may receive adhesive from a melter, and include positive displacement fluid dispensers that intermittently apply a flow of the adhesive to a substrate. The fluid dispensers actuate between an on cycle, during which adhesive is flowing through a nozzle of the dispenser, and an off cycle, during which adhesive is prevented from flowing through the nozzle of the dispenser. During the off cycle, unused adhesive can build up within the applicator, which leads to elevated pressures within the applicator. Upon commencing the next on cycle, the built-up adhesive within the applicator causes the adhesive to exit the dispenser nozzle at an inconsistent flow rate or a flow rate that is different than intended. This leads to adhesive pattern deformation on the substrate.

To remedy this issue, some applicators include recirculation hoses that redirect and transport unused adhesive back to the melter during the fluid dispenser off cycle. However, the use of a recirculation hose creates some drawbacks. Recirculation hoses prevent the dynamic control of the flow rate of the recirculated adhesive, which can decrease the accuracy of the flow of adhesive from the dispenser nozzle. Additionally, adhesive can harden and create char within the recirculation hose, which can flow downstream and clog the adhesive flow path. Further, recirculation hoses can be costly and require additional temperature control systems to maintain the flow of recirculated adhesive in a liquid state.

Therefore, there is a need for an applicator for dispensing adhesive that allows for dynamically managing and controlling the flow rate of recirculated adhesive.

SUMMARY

A method for controlling a recirculation pump assembly is disclosed. The method includes receiving a process-dependent characteristic and determining a recirculation flow rate of adhesive that flows to the recirculation pump assembly based on the process-dependent characteristic. The method further includes determining a recirculation pump speed of the recirculation pump assembly for pumping the adhesive to a supply channel using the recirculation flow rate, and adjusting an operating speed of the recirculation pump assembly to match the recirculation pump speed. A system and storage device for performing the above method are also disclosed.

BRIEF DESCRIPTION OF THE DRAWINGS

The foregoing summary, as well as the following detailed description, will be better understood when read in conjunction with the appended drawings. The drawings show illustrative embodiments of the invention. It should be understood, however, that the application is not limited to the precise arrangements and instrumentalities shown.

DETAILED DESCRIPTION OF ILLUSTRATIVE EMBODIMENTS

Figure 1:
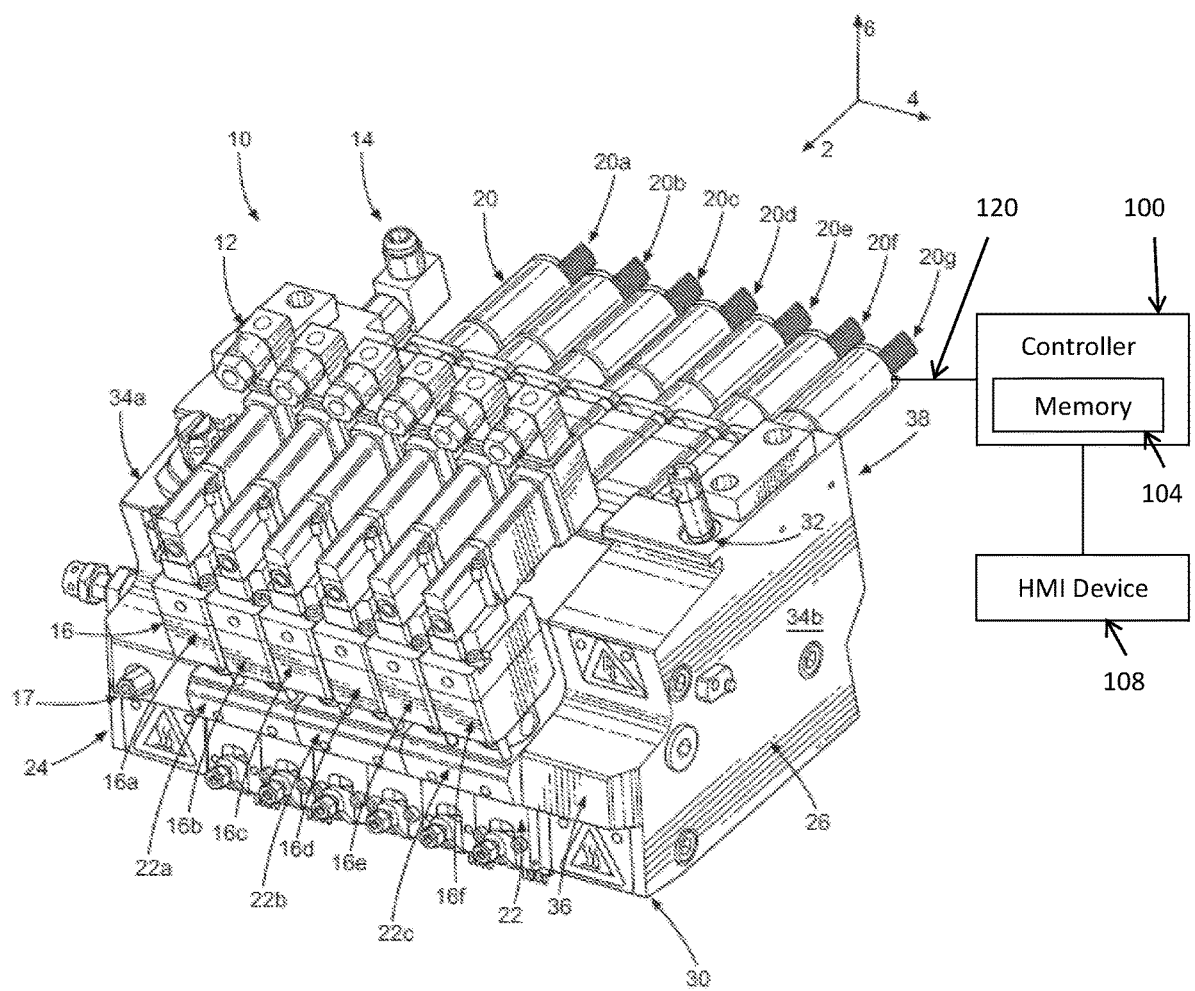
FIG. 1 is a front perspective view of an applicator according to an embodiment of the present invention.

Described herein is an applicator 10 that includes dispensing modules 16*a*-16*f* and pump assemblies 20*a*-20*g*, where pump assembly 20*g* is a dedicated recirculation pump assembly. The applicator 10 also includes a controller 100 and a human-machine interaction ("HMI") device 108 in communication with the recirculation pump assembly 20*g*, where the controller 100 is configured to dynamically control the operation of the recirculation pump assembly 20*g*. The controller also includes a memory 104 that can store a program that, when executed by the processor of the controller, dynamically controls the operation of the recirculation pump assembly 20*g*.

Certain terminology is used to describe the applicator 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the applicator 10 and related parts thereof. The words "forward" and "rearward" refer to directions in a longitudinal direction 2 and a direction opposite the longitudinal direction 2 along the applicator 10 and related parts thereof. The terminology includes the above-listed words, derivatives thereof, and words of similar import.

Unless otherwise specified herein, the terms "longitudinal," "vertical," and "lateral" are used to describe the orthogonal directional components of various components of the applicator 10, as designated by the longitudinal direction 2, lateral direction 4, and vertical direction 6. It should be appreciated that while the longitudinal and lateral directions 2 and 4 are illustrated as extending along a horizontal plane, and the vertical direction 6 is illustrated as extending along a vertical plane, the planes that encompass the various directions may differ during use.

Embodiments of the present invention include an applicator 10 for dispensing adhesive onto a substrate during product manufacturing. Referring to FIGS. 1-5, the applicator 10 includes a manifold 12. The applicator 10 has a top surface 32, a bottom surface 30 opposite the top surface 32 along the vertical direction 6, a first side surface 34*a*, a second side surface 34b opposite the first side surface 34a along the lateral direction 4, a front surface 36, and a back surface 38 opposite the front surface 36 along the longitudinal direction 2. The first and second side surfaces 34a and 34b extend from the front surface 36 to the back surface 38, as well as from the bottom surface 30 to the top surface 32. The manifold 12 is defined by a first end plate 24, a second end plate 26, and at least one manifold segment 22 disposed between the first and second end plates 24 and 26. As a result, the first and second end plates 24 and 26 are spaced apart along the lateral direction 4. The first and second end plates 24 and 26 and the manifold segments 22 may be releasably connected such that manifold segments 22 may be added or taken away from the applicator 10 as operating conditions require. As a result, even though FIGS. 1-5 show applicator 10 as including three manifold segments 22a-22c, applicator 10 can include more or less manifold segments 22 as desired. However, in another embodiment, the manifold 12 may be a unitary manifold.

Figure 2:
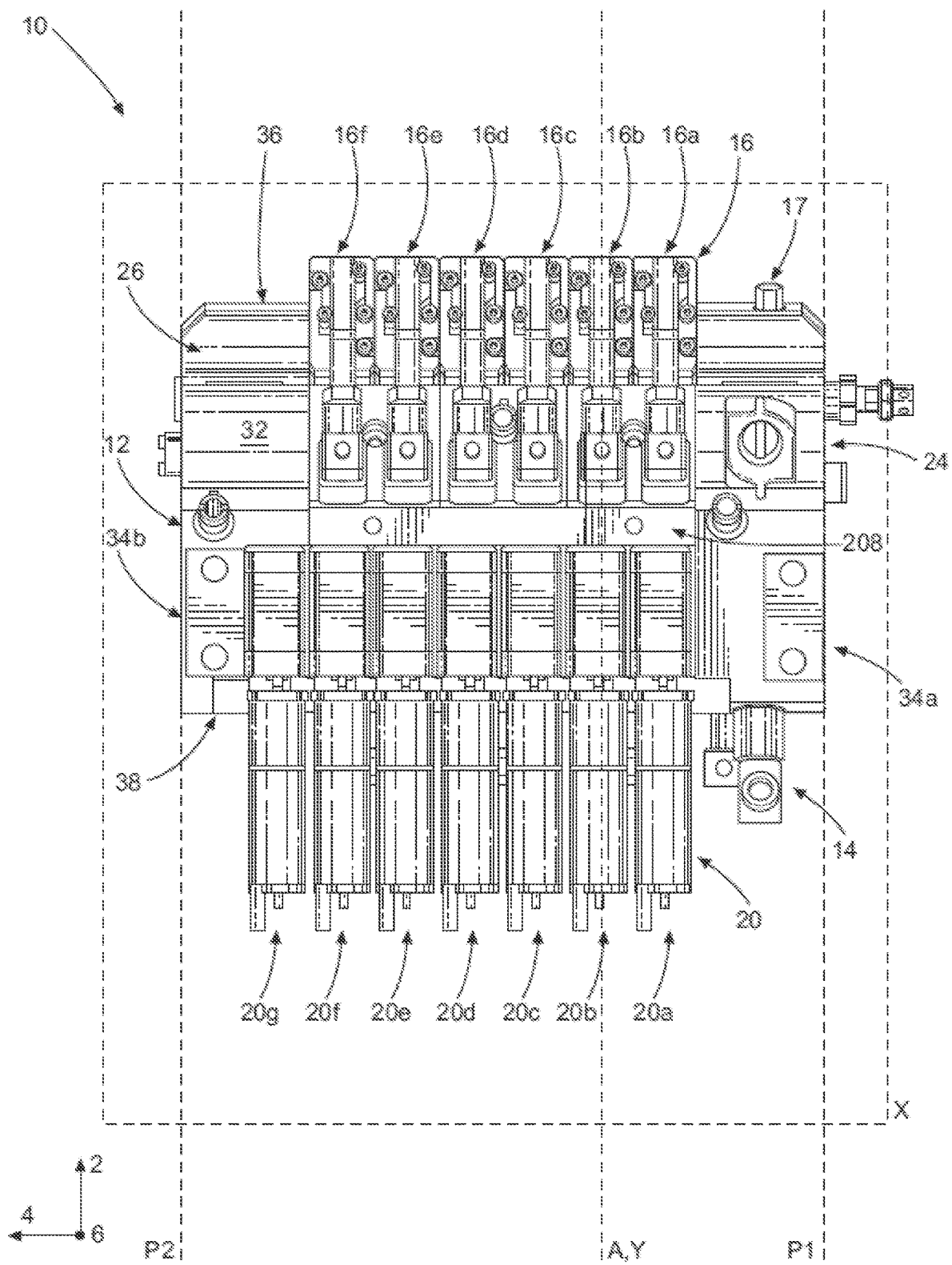
FIG. 2 is a top view of the applicator shown in FIG. 1.
Figure 3:
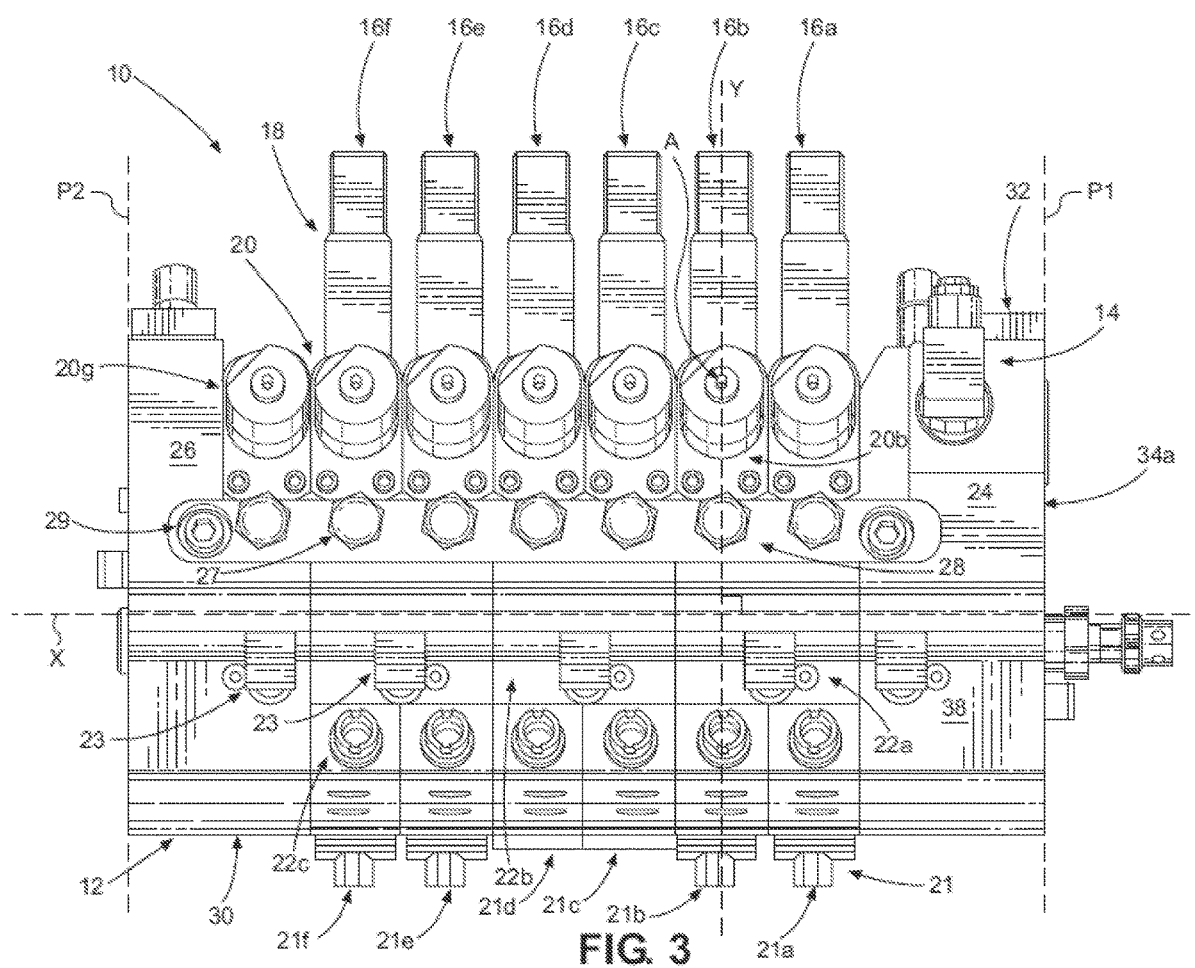
FIG. 3 is a rear view of the applicator shown in FIG. 1.
Figure 4:
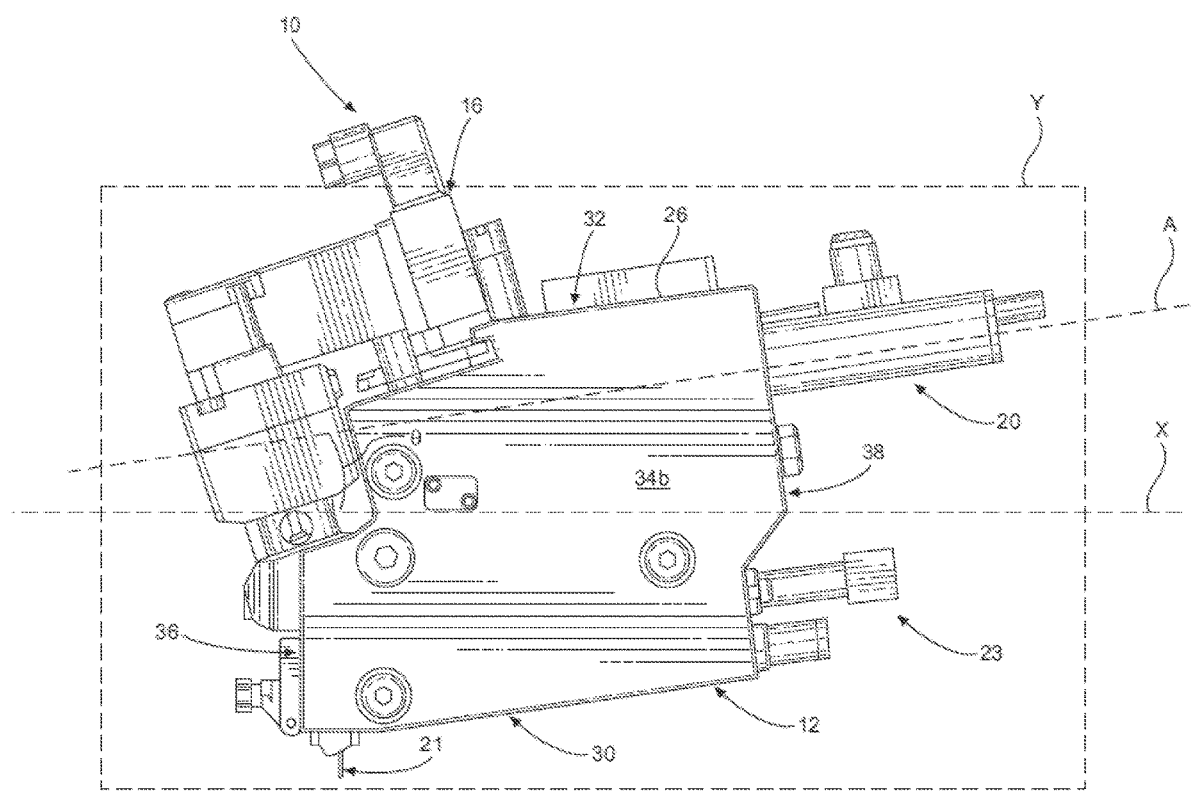
FIG. 4 is a side view of the applicator shown in FIG. 1.

Referring to FIGS. 2-4, the first side surface 34a of the manifold 12 lies within a first plane P1, while the second side surface 34b lies within a second plane P2. The second plane P2 may be parallel to the first plane P1. However, the first and second planes P1 and P2 may not be parallel if the first and second side surfaces 34a and 34b are angled with respect to each other. The applicator 10 defines a horizontal plane X, such that the lateral and longitudinal directions 4 and 2 lie within the horizontal plane X. The pump assembly 20 may define a drive shaft axis A that lies within a plane Y. The interrelationship of these planes and axes will be described further below.

The applicator 10 includes an input connector 14, through which adhesive is pumped into the manifold 12. The manifold 12 may further include a pressure release valve 17 that allows a user to attenuate pressure created by adhesive within the manifold, and a dispensing module 16 for applying the adhesive to a substrate. When the pressure release valve 17 is opened, adhesive may drain from the manifold through a drain (not shown). The applicator 10 also includes a pump assembly 20 removably mounted to the manifold 12. The pump assembly 20 pumps adhesive flowing from an interior channel of the manifold 12 to the dispensing module 16, which then dispenses adhesive out of the applicator through a nozzle 21. The applicator 10 may include thermal elements 23 that are configured to elevate the temperature of the manifold 12, which, in turn, elevates the temperature of the pump in each pump assembly 20. Though FIGS. 1-5 depict the applicator 10 as including five thermal elements 23a-23e, any number of thermal elements 23 can be included as required.

In various embodiments, the applicator 10 includes multiple sets of pump assemblies 20, dispensing modules 16, and nozzles 21. As illustrated in FIGS. 1-5, for example, the applicator 10 is depicted as including seven pump assemblies 20a, 20b, 20c, 20d, 20e, 20f, and 20g. Although FIGS. 1-5 illustrate seven pump assemblies 20a-20g, the applicator 10 can include any number of pump assemblies 20 as desired. For example, the applicator 10 can include two pump assemblies, three pump assemblies, or more than three pump assemblies. The pump assemblies 20a-20g may be arranged in a side-by-side configuration to increase the processing width of the applicator 10. For clarity, a single pump assembly 20 is described below. However, reference number 20 can be used interchangeably with reference numbers 20a-20g. Though the pump assemblies 20a-20g are depicted as being similarly sized, each of the individual pump assemblies 20 included in the applicator 10 can be individually sized as desired to suit a particular purpose. For example, the recirculation pump assembly 20g, which will be described further below, may be larger than the other pump assemblies 20a-20f.

Additionally, the applicator 10 is depicted as including six dispensing modules 16a, 16b, 16c, 16d, 16e, and 16f. Although FIGS. 1-3 illustrate six dispensing modules 16a-16f, the applicator 10 can include any number of dispensing modules 16 as desired. For example, the applicator 10 can include one dispensing module, two dispensing modules, or more than two dispensing modules. Similarly, a single dispensing module 16 is described below. However, the reference number 16 can be used interchangeably with reference numbers 16a-16f. The applicator 10 is also depicted as including six nozzles 21a, 21b, 21c, 21d, 21e, and 21f Each of nozzles 21a-21f may receive an adhesive feed from a corresponding dispensing module 16, or a combination of several of the dispensing modules 16a-16f. The configuration of the nozzles 21a-21f can be changed by a user as operation conditions require, which can include adding additional nozzles 21 or removing any of the nozzles 21a-21f that are already coupled to the applicator 10. Additionally, the nozzles 21a-21f can be different types chosen to suit particular dispensing applications. For example, as shown in FIG. 3, nozzles 21a, 21b, 21e, and 21f can be one type of nozzle, while nozzles 21c and 21d can be a different type of nozzle.

Continuing with FIGS. 1-5, each of pump assemblies 20a-20f may be associated with a corresponding one of the dispensing modules 16a-16f. In operation, each of pump assemblies 20a-20f may pump adhesive that is supplied by the manifold 12 to the corresponding one of the dispensing modules 16a-16f, such that the dispensing modules 16a-16f apply the adhesive to a given substrate through the nozzles 21a-21f. However, each dispensing module 16 may not correspond to a single pump assembly 20, such that multiple pump assemblies 20 pump adhesive to a single dispensing module 16. Additionally, each of the pump assemblies 20 and each of the dispensing modules 16 may be coupled to and associated with a respective manifold segment 22. However, two or more pump assemblies 20 and/or two or more dispensing modules 16 may be coupled to a single manifold segment 22.

Figure 5:
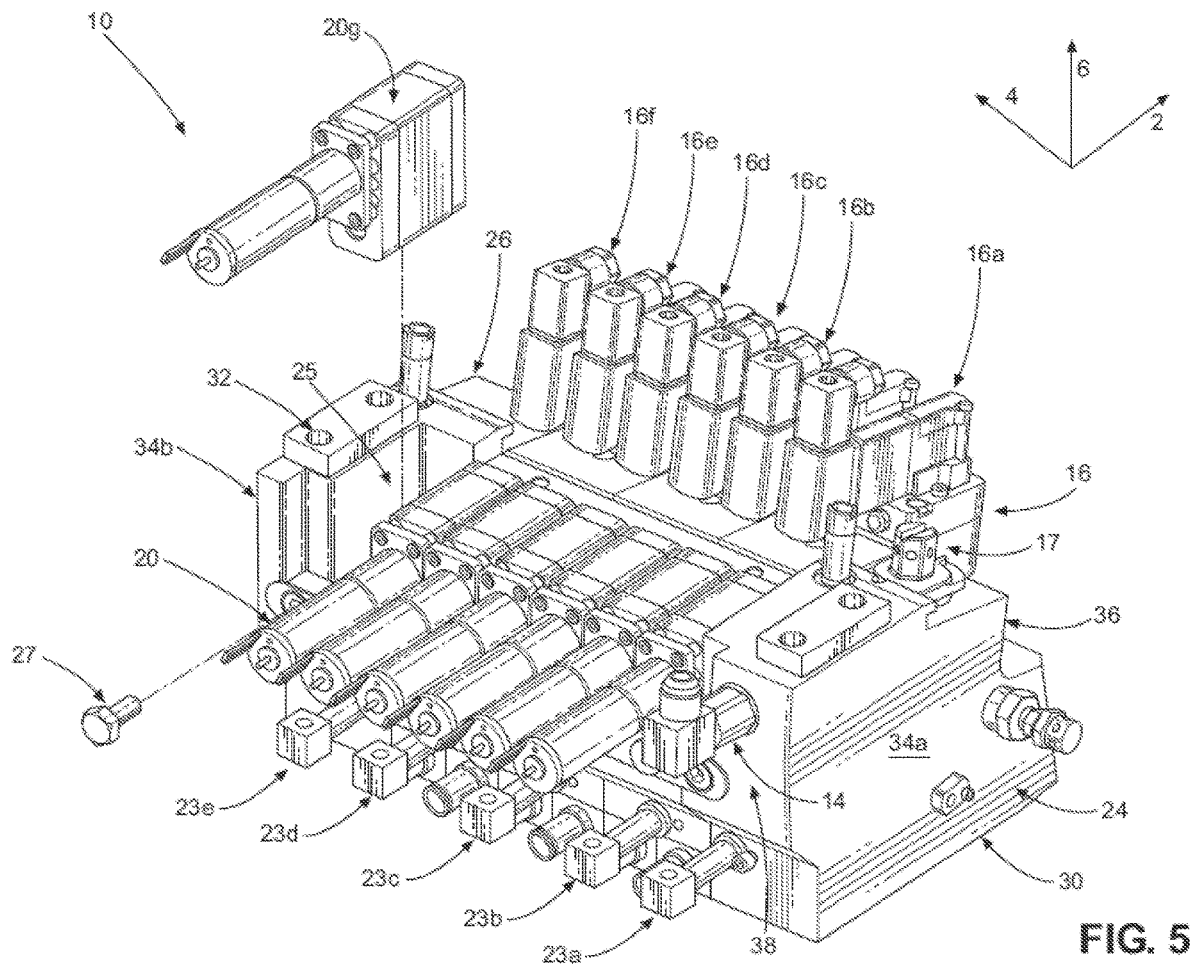
FIG. 5 is a rear perspective view of the applicator shown in FIG. 1, with a recirculation pump assembly removed from the applicator.

The pump assembly 20g, however, is not associated with a particular dispensing module 16, but is designated as the recirculation pump assembly. The function of the recirculation pump assembly 20g may include pumping the adhesive through a recirculation channel 236, as will be described below. As such, the inlet of the pump assembly 20g is in fluid communication with the recirculation channel 236, and the outlet of the pump assembly 20g is in fluid communication with the supply channel 200. Though the pump assembly 20g is shown as the pump assembly 20 positioned closest to the second side surface 34b, the recirculation pump assembly 20g may be positioned anywhere along the series of pump assemblies 20a-20g. For example, the recirculation pump assembly 20g may be positioned as the pump assembly closest to the first side surface 34a, or at a location in the middle of the pump assemblies 20a-20g. When the pump assembly 20g is positioned as the closest pump to the first or second side surface 34a or 34b of the applicator 10, the particular one of the first or second end plates 24 or 26 that the pump assembly 20g abuts may be configured to receive a portion of the pump assembly 20g. For example, as shown in FIG. 5, the second end plate 26 includes a recess 25 that is sized to receive the pump assembly 20g. When the pump assembly 20g is disposed in the recess 25, the pump assembly 20g may be substantially in line with the other pump assemblies 20a-20f along the longitudinal and vertical directions 2 and 6.

Additionally, though in this embodiment pump assembly 20g is configured to be the sole recirculation pump assembly for the applicator 10, it is contemplated that in other embodiments the applicator 10 can include multiple recirculation pump assemblies (not shown), each of which can be similarly configured as pump assembly 20g. For example, each dispensing module 16 can correspond to a unique recirculation pump assembly. Alternatively, the applicator 10 can include multiple recirculation pump assemblies that collectively pump adhesive through a single recirculation channel. Further, in other embodiments the applicator 10 can include a pump assembly that includes the functionality of both pumping adhesive to a dispensing module 16, as well as pumping adhesive through the recirculation channel. Such a pump assembly may be configured as a single dual-gear stack pump, where one gear stack functions to pump adhesive to a dispensing module 16, while the other functions to pump adhesive through the recirculation channel. Each gear stack can contain one driving gear and one driven gear, and each gear stack can be contained within a common pump body. Alternatively, each gear stack can be contained within separate respective pump bodies. Further, each gear stack can be driven by a common motor, or alternatively be independently driven by separate respective motors.

Though shown in FIGS. 1-5 as being mounted to the manifold 12, the recirculation pump assembly 20g may be spaced from the manifold 12. In this configuration, the recirculation pump assembly 20g is connected to the manifold 12 by one or more hoses, which allows the pump assembly 20g to receive adhesive from and pump adhesive to the manifold 12. For example, one hose may direct adhesive from the recirculation channel 236 to the recirculation pump assembly 20g, while a second hose may direct adhesive from the recirculation pump assembly 20g to the supply channel 200.

Referring back to FIG. 1, the recirculation pump assembly 20g can be controlled by a controller 100 and/or a HMI device 108 in communication with the controller 100. The controller 100 may include one or more controllers and may also be referred to as one or more processors. The controller 100 and/or the HMI device 108 can be in wired and/or wireless communication with the recirculation pump assembly 20g through a communication link 120, and can be configured to transmit instructions to the recirculation pump assembly 20g through the communication link 120. The controller 100 can be a programmable logic controller (PLC), a microprocessor based controller, a personal computer, or another conventional control device capable of carrying out the functions described herein as understood by a person having ordinary skill in the art. For example, the controller 100 can perform the various methods relating to controlling the recirculation pump assembly 20g based upon user input, as described in detail below. Additionally, the controller 100 can perform the various methods related to controlling the recirculation pump assembly 20g based upon a library of operational cycles or sequences that are stored in a memory unit 104 of the controller 100. The memory unit 104 may include one or more memory units, and may also be referred to as a storage device. The operational sequences are recalled and placed in a particular control program, as desired, executing on the controller 100. The operational sequences can be adjusted to accommodate different dispensing operations, different types of substrates, or different types of material, for example through the HMI device 108.

The HMI device 108 is operatively connected to the controller 100 in a known manner. The HMI device 108 may include input devices and controls, such as a keypad, push-buttons, control knobs, a touch screen, etc., and output devices, such as displays and other visual indicators, that are used by an operator to control the operation of the controller 100 and, thereby, control the operation of the recirculation pump assembly 20g. The HMI device 108 may further include an audio output device, such as a speaker, by which an audio alert may be communicated to an operator. Using the HMI device 108, an operator can enter parameters such as maximum flow rate, pattern length per product, patterns per minute, line speed, type of substrate, identifier of the substrate, description of the substrate, type of material, distance between the substrate and the applicator 10, etc. Additionally, the controller 100 and/or the HMI device 108 can be in wired and/or wireless communication with an external network (not shown), such that the operator can access the controller 100 remotely from a separate system or device.

Continuing with FIGS. 3 and 4, each pump assembly 20 may be mounted to the manifold 12 in a number of different configurations. In one embodiment, each pump assembly 20 is mounted to the manifold 12 so that the bottom surface of the pump, which includes an inlet and an outlet, faces the manifold 12 at a location that is spaced apart from and located between the first and second side surfaces 34a and 34b. In this configuration, the drive motor axis A does not intersect either the first side surface 34a or the second side surface 34b of the applicator 10. Rather, the pump assembly 20 is positioned on the manifold 12 such that the drive motor axis A may lie in a plane Y that is parallel to the first plane P1, in which the first side surface 34a lies, as described above. The plane Y may also be parallel to the second plane P2, in which the second side surface 34b lies. Each pump assembly 20a-20g has a respective axis A that lies within a respective plane that may be parallel to the first plane P1 and/or the second plane P2. Further, when mounted to the manifold 12, the pump assemblies 20a-20f can be positioned such that the inlets of each of the pump assemblies 20a-20f are positioned above the outlets along the vertical direction 6. However, the recirculation pump assembly 20g can be mounted to the manifold 12 such that the outlet is positioned above the inlet along the vertical direction 6.

Each pump assembly 20 is positioned on the manifold 12 such that the drive motor axis A is oriented in any particular direction within plane Y. For example, the pump assembly 20 can be positioned on the manifold 12 such that the drive motor axis A lies within plane Y and is angularly offset with respect to plane X. For instance, the pump assembly 20 can be positioned on the manifold 12 such that the drive motor axis A defines an angle $\theta$ with plane X. The angle $\theta$ can be any angle as desired. In one embodiment, the angle $\theta$ is an acute angle. Alternatively, the angle $\theta$ can be an obtuse angle, an angle greater than 180 degrees, or substantially 90 degrees.

Referring to FIG. 3, each of the pump assemblies 20a-20g is removably attached to the manifold 12. In one embodiment, each pump assembly 20 is secured to a plate 28 via a fastener 27. The plate 28 is attached at one end to the first end plate 24 via a fastener 29, and at the opposite end to the second end plate 26 via another fastener 29. The fasteners 29 can also attach the plate 28 to one of the manifold segments 22. Fasteners 27 may be threaded, such that removing a pump assembly 20 from the manifold 12 requires unscrewing fastener 27 from the pump assembly 20 and removing the pump assembly 20 from the manifold 12. However, other methods of releasably attaching the pump assemblies 20 to the manifold 12 are contemplated, such as a slot and groove system, snap fit engagement, etc. Because the pump assemblies 20 may be releasably coupled to the manifold 12 in the above manner, a particular pump assembly 20 may be individually replaced without completely disassembling the entire applicator 10. Pump assemblies 20 may require replacement for a variety of reasons, including cleaning, damage, or changed adhesive pumping conditions or requirements.

Continuing with FIGS. 6-7, the flow path of adhesive through the applicator 10 will be described. The flow of adhesive through any particular element is represented by solid arrows that appear in the associated figures. The applicator 10 may be attached to an adhesive supply (not shown) by a hose (not shown), which attaches to the input connector 14 (FIG. 5). The adhesive supply can be any device capable of supplying adhesive to the applicator 10. For example, the adhesive supply may be a melter configured to supply hot-melt adhesive to the applicator 10. The adhesive flows from the adhesive supply, through the hose, through the input connector 14, and into the supply channel 200 defined by the manifold 12 of the applicator 10. The supply channel 200 may extend from the first side surface 34a, through each of the manifold segments 22a-22c, and to the second side surface 34b. However, the supply channel 200 may not necessarily extend entirely from the first side surface 34a to the second side surface 34b, but may terminate at an interior location between the first and second side surfaces 34a and 34b. Additionally, the supply channel 200 may extend between other combinations of surfaces of the manifold 12 as desired.

The manifold 12 includes a pressure release valve 17 that regulates flow in a pressure release channel (not shown) that is in fluid communication with the supply channel 200. The pressure release valve 17 is depicted as being positioned at the front surface 36 of the manifold 12. However, the pressure release valve can be positioned on any surface of the manifold 12 as desired. The pressure release valve 17 is capable of being alternated between an open position and a closed position. When an operator desires to relieve adhesive pressure within the supply channel 200, the pressure release valve 17 is switched from the closed position to the open position. In the open position, adhesive flows from the supply channel 200, through the pressure release channel, and out of the applicator 10 through a drain (not shown). Pressure relief may be desired when the operator is about to commence a service or maintenance operation of the applicator 10.

As the supply channel 200 extends through the manifold 12, it supplies adhesive to each of the pump assemblies 20a-20f, with the exception of the designated recirculation pump assembly 20g. For simplicity, a cross-section of the applicator 10 shown in FIGS. 6-7 only shows the supply of adhesive to one pump assembly 20 and one dispensing module 16. However, the supply channel 200 may supply each additional pump assembly 20 and dispensing module 16 similarly. The manifold segment 22 defines a first segment input channel 204, which extends from the supply channel 200 to a diverter plate 208, which may be positioned on the applicator 10 between the pump assembly 20 and the manifold segment 22b. The diverter plate 208 may be removably coupled to the applicator 10, and may define a variety of passages for carrying adhesive from the manifold 12, to the pump assemblies 20, and back. For example, as shown in FIG. 6, the diverter plate 208 defines a diverter input channel 212 that extends from the first segment input channel 204 to the inlet 52 of the pump assembly 20. The diverter plate 208 may also define a diverter output channel 216 that extends from the outlet 54 of the pump assembly 20d to a second segment input channel 220. However, the diverter plate 208 may include different channel configurations than those shown. The diverter plate 208 shown in FIG. 13 may function as one of many interchangeable diverter plates that may be used to variably route the adhesive through the applicator 10 as different dispensing operations require.

Figure 6:
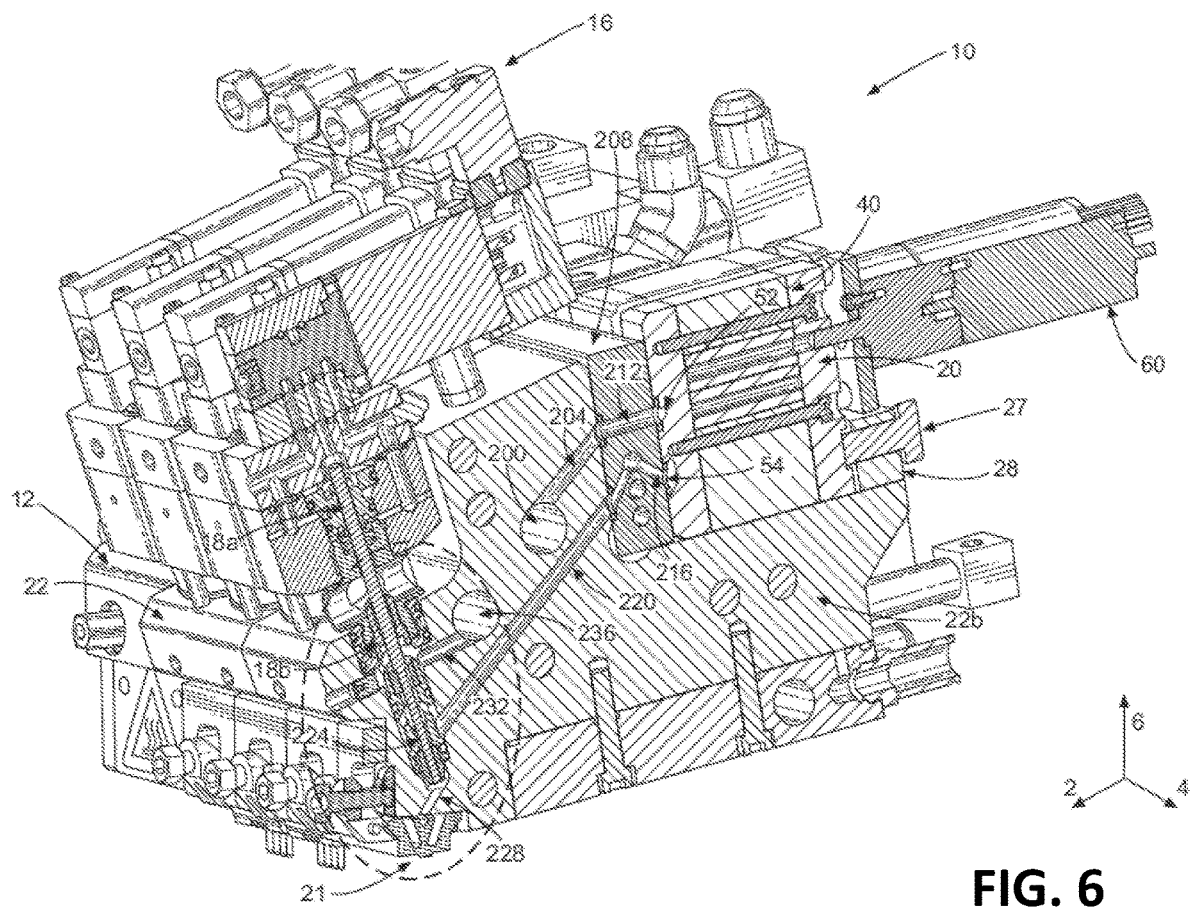
FIG. 6 is a perspective view of the applicator shown in FIG. 1, in horizontal cross-section.
Figure 7:
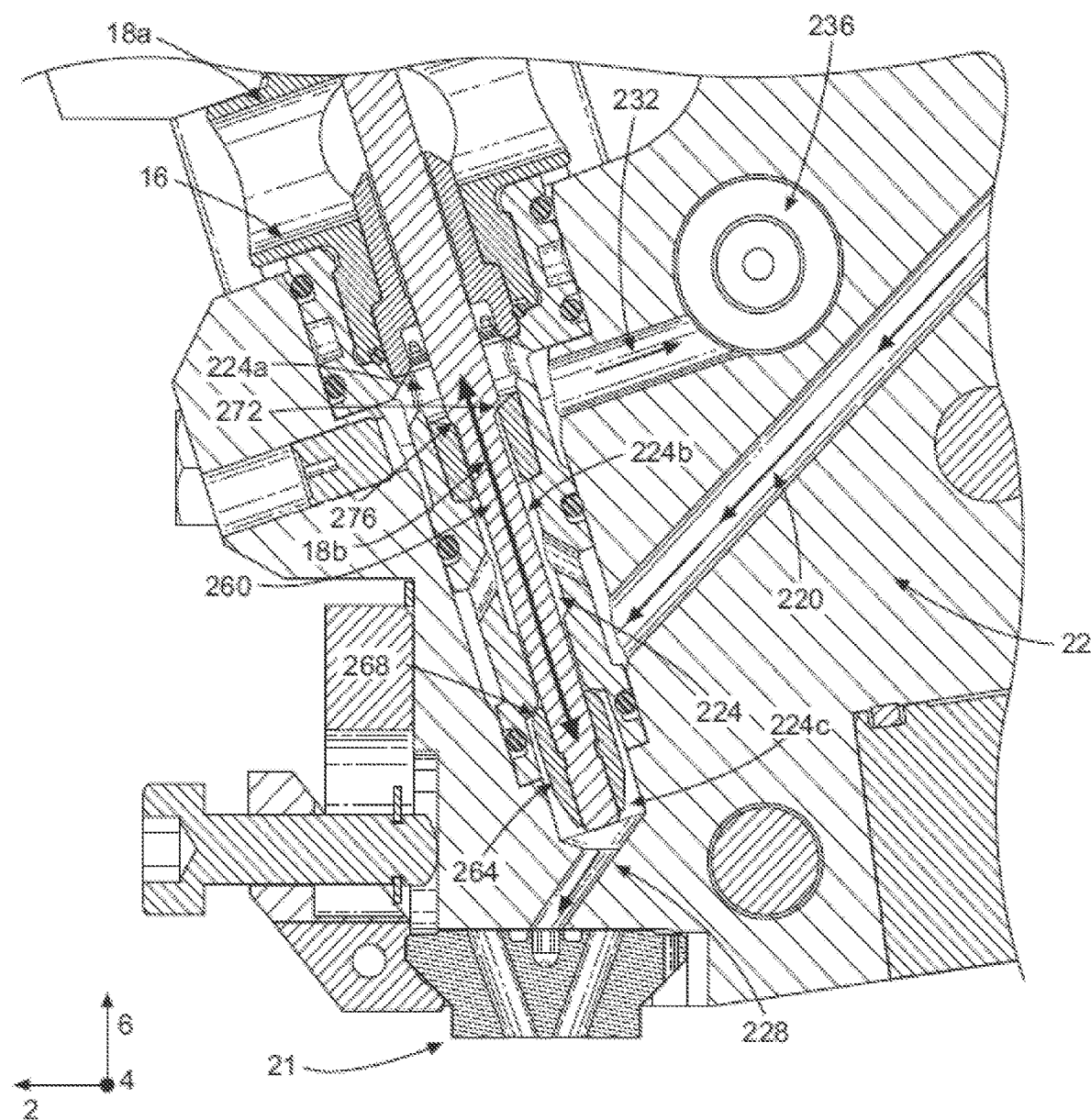
FIG. 7 is an enhanced view of the encircled region shown in FIG. 6.

In the embodiment shown in FIGS. 6-7, the adhesive flows from the supply channel 200, through the first segment input channel 204, through the diverter input channel 212, and to the inlet 52 of the pump assembly 20. The pump assembly 20 then pumps the adhesive out of the outlet 54 at a predetermined volumetric flow rate, which may be different than the volumetric flow rate of the adhesive upon entering the inlet 52 of the pump assembly 20. From there, the adhesive flows through the diverter output channel 216, through the second segment input channel 220, and to a dispensing flow path 224. The dispensing flow path 224 is defined by the lower portion 18b of the dispensing module 16, which is received by the manifold segment 22. The dispensing flow path 224 defines an upper section 224a, a lower section 224c opposite the upper section 224a, and a central section 224b disposed between the upper and lower sections 224a and 224c. The lower section 224c of the dispensing flow path 224 is in fluid communication with a nozzle channel 228, which extends away from the dispensing flow path 224. The upper section 224a of the dispensing flow path 224 is in fluid communication with a recirculation feed channel 232, which extends from the upper section 224a of the dispensing flow path 224 to a recirculation channel 236. The recirculation channel 236 will be discussed further below.

The lower portion 18b of the dispensing module 16 is the portion of the applicator 10 that directly interacts with the adhesive to control flow of the adhesive out of the applicator 10. The applicator 10 may include a valve stem 260 that extends from an upper portion 18a of the dispensing module 16 that is opposite the lower portion 18b of the dispensing module 16, to the lower portion 18b of the dispensing module 16. The valve stem 260 may define a lower valve element 264 and an upper valve element 272 that is spaced from the lower valve element 264 along the valve stem 260. The lower portion 18b of the dispensing module 16 may define a lower valve seat 268 that is configured to interact with the lower valve element 264 of the valve stem 260, and an upper valve seat 276 that is spaced from the lower valve seat 268, where the upper valve seat 276 is configured to interact with the upper valve element 272 of the valve stem 260.

In operation, the valve stem 260 may alternate between a first position and a second position. When the valve stem 260 is in the first position, the dispensing module 16 is in an open configuration. When the valve stem 260 is in the second position, the dispensing module 16 is in a closed configuration. The upper and lower valve elements 272 and 264 may substantially face in opposite directions, such that each of the upper and lower valve elements 272 and 264 interact with the corresponding upper and lower valve seats 276 and 268 in different ones of the first position and second position. In FIGS. 6-7, the upper valve element 272 is shown as facing away from the upper portion 18a of the dispensing module 16, while lower valve element 264 is shown as facing toward the upper portion 18a of the dispensing module 16. However, in another embodiment this relationship may be reversed, such that the upper valve element 272 faces toward the upper portion 18*a* of the dispensing module 16, while the lower valve elements 264 faces away from the upper portion 18*a* of the dispensing module 16. In one embodiment, in the first position, the valve stem 260 is lowered within the dispensing flow path 224, such that the upper valve element 272 of the valve stem 260 engages the upper valve seat 276, and the lower valve element 264 is spaced from the lower valve seat 268. In this position, the engagement between the upper valve element 272 and the upper valve seat 276 blocks adhesive from flowing from the central section 224*b* of the dispensing flow path 224 to the upper section 224*a*. Rather, the lack of engagement between the lower valve element 264 and the lower valve seat 268 permits adhesive to flow from the central section 224*b* of the dispensing flow path 224 to the lower section 224*c*. As such, when the valve stem 260 is in the first position, adhesive flows from the second segment input channel 220, through the central and lower sections 224*b* and 224*c* of the dispensing flow path 224, and to the nozzle channel 228. From the nozzle channel 228, the adhesive then flows through the nozzle 21 and out of the applicator 10. Accordingly, the first position of this embodiment is the position in which the applicator 10 applies adhesive to a substrate during a manufacturing operation.

In the second position, the valve stem 260 is raised within the dispensing flow path 224, such that the upper valve element 272 of the valve stem 260 is spaced from the upper valve seat 276, and the lower valve element 264 engages the lower valve seat 268. In this position, the engagement between the lower valve element 264 and the lower valve seat 268 blocks adhesive from flowing from the central section 224*b* of the dispensing flow path 224 to the lower section 224*c*. Rather, the lack of engagement between the upper valve element 272 and the upper valve seat 276 permits adhesive to flow from the central section 224*b* of the dispensing flow path 224 to the upper section 224*a*. As such, in the second position, adhesive flows from the second segment input channel 220, through the central and upper sections 224*b* and 224*a* of the dispensing flow path 224, and to the recirculation feed channel 232. From the recirculation feed channel 232, the adhesive flows into the recirculation channel 236. Though one dispensing module 16 and manifold segment 22 is shown in cross section in FIGS. 6-7, each additional dispensing module 16 and manifold segments 22 may be similarly configured. Further, the valve stem 260 of each dispensing module 16 may be configured to be actuated between the first and second positions independent of any of the other valve stems 260, such that at any time the valve stems 260 of the dispensing modules 16 may be in any combination of the first and second positions. Alternatively, any combination of the valve stems 260 may be configured to transition between the first and second positions in unison.

The ability to alternate the valve stem 260 between the particular first and second positions described above serves several purposes. One purpose is that, during an adhesive dispensing operation, a consistent flow of adhesive may not be required or desired. As such, an operator of the applicator 10 must be able to selectively actuate the dispensing modules 16 to both provide and prevent a flow of adhesive to the substrate. Transitioning the valve stem 260 from the first position to the second position blocks adhesive from exiting the applicator 10, while transitioning the valve stem 260 from the second position to the first position allows adhesive to exit the applicator 10. Another purpose of the alternative valve stem 260 described above relates to the pressure within the flow path of the adhesive. When the valve stem 260 is in the first position, the adhesive is permitted to flow through the gap between the lower valve element 264 and the lower valve seat 268, and exit the applicator 10 through the nozzle 21. However, when the valve stem 260 is in the second position, the adhesive cannot flow through this gap. As such, the potential exists for unused adhesive to back up within the dispensing flow path 224 and/or the second segment input channel 220. This back-up can cause pressure to build up within the applicator 10. This pressure, upon the next transition of the valve stem 260 from the second position to the first position, can cause a pattern deformation, such as hammerhead, of the adhesive on the substrate.

The inclusion of the recirculation channel 236 in the applicator 10 helps alleviate this issue. When the valve stem 260 is in the second position, the ability of the adhesive to flow from the central section 224*b* of the dispensing flow path 224 to the upper section 224*a*, and through the recirculation feed channel 232 to the recirculation channel 236 provides the adhesive the ability to escape the dispensing flow path 224. This may alleviate any pressure build-up that could occur when the valve stem 260 is in the second position, thus aiding in standardizing the flow of adhesive through the nozzle 21 when the valve stem 260 is in the first position. However, the addition of the recirculation channel 236 alone may not fully rectify this issue. Adhesive flowing through recirculation channel 236 inherently creates some amount of pressure within the recirculation channel 236. In a configuration where the recirculation channel 236 directs the adhesive back to the inlet 52 of the pump assembly 20, or to supply tank that supplies the adhesive to the applicator 10, a differential may exist between the pressure of the adhesive flowing through the recirculation channel 236 and the adhesive flowing through the supply channel 200 when the valve stem 260 is in the second position. This pressure differential, like the differential that may exist without the recirculation channel 236 when the valve stem 260 is in the second position, may negatively impact the flow rate of the adhesive from the applicator 10 when the valve stem 260 is in the first position. In particular, this differential may cause the flow rate of the adhesive flowing through the nozzle 21 to be inconsistent.

Figure 8:
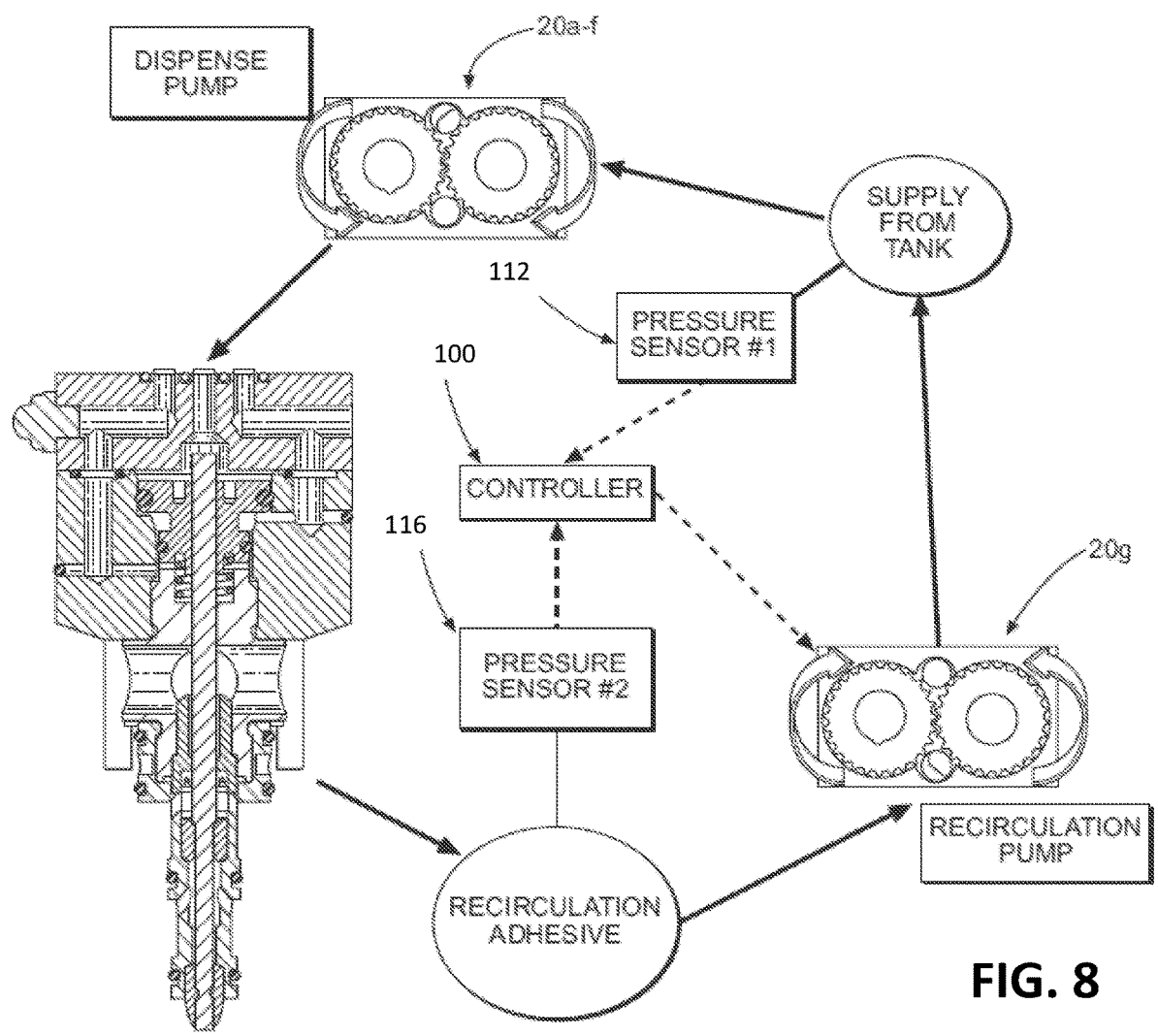
FIG. 8 is a process flow diagram illustrating a method of controlling the adhesive recirculation according to an embodiment of the present disclosure.

FIG. 8 illustrates a process flow diagram depicting a system for managing the flow of adhesive through the recirculation channel 236. Solid lines and arrows indicate the flow of adhesive through the applicator 10, and dashed lines and arrows indicate the transfer of information. The adhesive flows from an adhesive supply (not shown), through a hose (not shown) that is coupled to the input connector 14 (FIG. 1) of the applicator 10, and into the supply channel 200. As the adhesive flows through the supply channel 200, it flows at a first pressure. To detect the first pressure, a first pressure sensor 112 may be disposed within the supply channel 200. The first pressure sensor 112 may be any type of pressure sensor that is capable of measuring the pressure of a fluid, such as, for example, a pressure transducer. The first pressure sensor 112 may measure the first pressure of the adhesive as it flows through the supply channel 200 to the pump assembly 20. The adhesive then flows through dispensing pumps 20*a*-20*f*, which subsequently pump the adhesive to the dispensing modules 16*a*-16*f*. When the valve stems 260 of the dispensing modules 16*a*-16*f* are in the first position, the adhesive flows out of the nozzles 21. Alternatively, when the valve stems 260 are in the second position, the adhesive flows into recirculation channel 236. The adhesive from each of the dispensing modules 16*a*-16*f* that flows into the recirculation channel 236 is directed to the recirculation pump assembly 20g. As the adhesive flows through the recirculation channel 236, it flows at a second pressure. To detect the second pressure, a second pressure sensor 116 may be disposed within the recirculation channel 236. The second pressure sensor 116, like the first pressure sensor 112, may be any type of pressure sensor that is capable of measuring the pressure of a fluid, such as a pressure transducer. Upon measuring the first and second pressures, the first and second pressure sensors 112 and 116 transmit the first and second pressures to the controller 100. The controller 100, using the pressure information received from the first and second pressure sensors 112 and 116, may actively direct the operation of the recirculation pump assembly 20g. Accordingly, the pump assembly 20g is operable independent of the other pump assemblies 20a-20f.

The recirculation pump assembly 20g functions to pump adhesive from the recirculation channel 236 back to the supply channel 200. In controlling the recirculation pump assembly 20g, the controller 100 can actively control the flow rate at which the recirculation pump assembly 20g pumps the adhesive through the recirculation channel 236 by automatically adjusting the speed (RPM) of the drive motor. As a result, the controller 100 can direct the recirculation pump assembly 20g to pump the adhesive at a flow rate sufficient to substantially equalize the second pressure of the adhesive flowing through the recirculation channel 236 with the first pressure of the adhesive flowing through the supply channel 200. Particularly, the controller 308 can direct the recirculation pump assembly 20g to increase the motor speed, decrease the motor speed, or maintain the same motor speed in response to either or both of the first and second pressures received from the first and second pressure sensors 112 and 116. This functions to attenuate any differential between the first and second pressures, which can aid in maintaining continuity in the volumetric output of the adhesive that is applied to a substrate via nozzles 21. Though the controller 100 may be capable of autonomously controlling operation of the recirculation pump assembly 20g such that the first and second pressures are substantially equal, or the differential between the first and second pressures is neutralized, an operator of the applicator 10 may optionally be able to manually control operation of the recirculation pump assembly 20g through the HMI device 108, or by running a program stored in the memory unit 104 of the controller 100.

Figure 9:
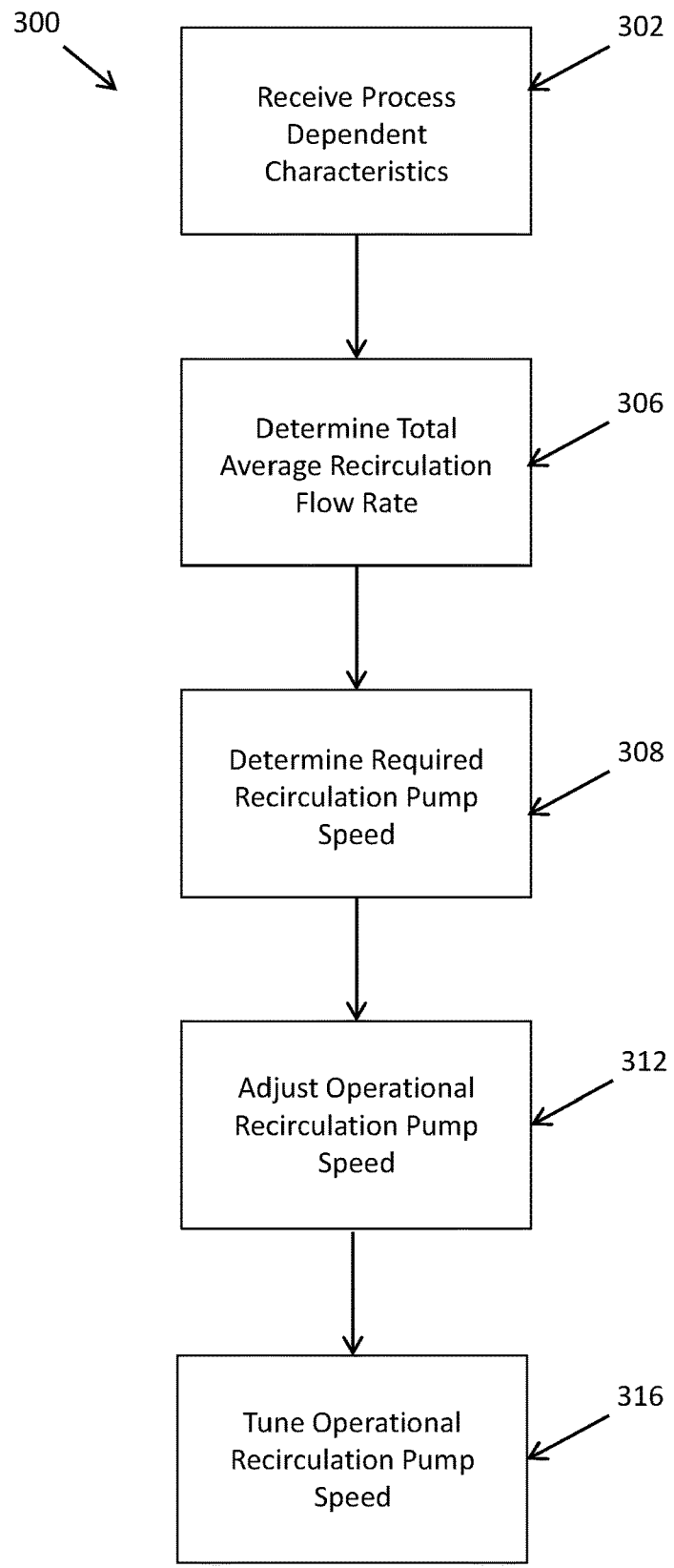
FIG. 9 is a process flow diagram of a method of controlling the recirculation pump assembly according to an embodiment of the present disclosure.

Now referring to FIG. 9, a method 300 is shown for actively controlling the operational speed of the recirculation pump assembly 20g to obtain a desired adhesive output from the applicator 10. First, in step 302, an operator of the applicator 10 inputs process-dependent characteristics related to the particular adhesive dispensing operation to be performed into the controller 100 through the HMI device 108. In some embodiments, the process-dependent characteristics may be received from a memory storing previously saved characteristics may be received or from a remote location, such as a remote server. Such characteristics can include the maximum pump speed of each of the pump assemblies 20a-20f, the maximum pump speed of the recirculation pump assembly 20g, the instantaneous line speed of an adhesive application operation, the maximum line speed of the adhesive application operation, the pattern length per product, and the number of patterns per minute. Each of these characteristics can vary depending on the particular adhesive dispensing operation to be carried out, type of adhesive to be dispensed, or substrate to which adhesive will be dispensed. The maximum pump speed of each pump assembly 20a-20f can be defined by units of revolutions per minute (RPM), which will be used in describing the rest of method 300 below. However, it is contemplated that in step 302, an operator can input the maximum flow rate of each pump assembly 20a-20f into the HMI device 108 in place of the maximum pump speed using units of grams per minute (g/min) or cubic centimeters per minute (cc/min). As a result, the calculations described below would change accordingly.

The instantaneous line speed is the measured speed of the adhesive dispensing operation in terms of the amount of a product or substrate to which adhesive is applied. The instantaneous line speed can be defined by units of number of products to which adhesive is applied per minute (products/min), or alternatively the distance over which adhesive is applied (in meters) to the products per minute (m/min). The maximum line speed is the maximum speed that adhesive can be applied to the products using the applicator 10 for a particular adhesive dispensing operation, and will be measured in the same units as the instantaneous line speed. The pattern length per product is the time period that the dispensing module 16 is in the open configuration for an individual product, and is measured in seconds (s). Specifically, the pattern length is the time period from when the dispensing module 16 transitions from the closed configuration to the open configuration, such that adhesive flows through the nozzle 21 and onto a product, to when the dispensing module 16 transitions from the open configuration to the closed configuration, such that adhesive no longer flows through the nozzle 21. The pattern lengths per minute is the total number of these dispensing steps that occurs in one minute (patterns/min).

The process-dependent characteristics can include numeral values related to the adhesive dispensing operation, or can alternatively include various non-numerical descriptive characteristics of the adhesive dispensing operation. Such descriptive characteristics can include the type of product to which adhesive will be applied, the skew of a particular product type, and the type of adhesive to be applied. When such descriptive characteristics are received, the controller 100 accesses the memory unit 104 and obtains the numerical characteristics (maximum pump speed, instantaneous line speed, maximum line speed, pattern length, patterns per minute, etc.) that correspond to the respective adhesive dispensing operation that the descriptive characteristics are referencing. As a result, an operator of the applicator 10 can pre-program the controller 100 such that the memory unit 104 contains the numeral characteristics of each potential adhesive dispensing operation. This can increase simplicity with which an operator controls the applicator 10.

Continuing with FIG. 9, in step 306 the controller 100 determines the total average recirculation flow rate. This value represents the average total volumetric flow rate of adhesive that flows to the recirculation channel 236 from each of the pumps 20a-20f in aggregate over a period of time, and is measured in units of cubic centimeters per minute (cc/min). This calculation can be performed using Equation 1, which is displayed below:

$$TFR_{avg} = \sum_{i=1}^{n} (MPS_i * LSR * VO_i * (1 - MOT_i)) \quad \text{Equation 1}$$

where $TFR_{avg}$=Total Average Recirculation Flow Rate (cc/min)
n=total number of pumps pumping adhesive to dispensing modules MPS$_i$=Maximum Pump Speed for Pump i (rev/min)
LSR=Line Speed Ratio (%)
VO$_i$=Volumetric Output for Pump i (cc/rev)
MOT$_i$=Dispensing Module On Time Ratio for Pump i (%)
In this equation, the average recirculation flow rate is calculated for each of the n number of pump assemblies 20 by multiplying the maximum pump speed MPS$_i$ for each pump assembly by the line speed ratio LSR, the volumetric output VO$_i$ for each pump assembly, and the quantity of one minus the dispensing module on time ratio MOT$_i$ for each pump assembly. Then, the average recirculation flow rates for all of the n number of pump assemblies 20 are summed, which produces the total average recirculation flow rate TFR$_{avg}$. As noted above, the maximum pump speed MPS$_i$ for each of the pump assemblies 20 can be entered by an operator into the HMI device 108 or retrieved from the memory unit 104 by the controller 100 upon entering a characteristic, such as a type of dispensing operation. The line speed ratio LSR for the particular adhesive dispensing operation being performed is calculated by dividing the instantaneous line speed by the maximum line speed, both of which can be user entered variables, as mentioned above, or can be retrieved from the memory unit 104 by the controller 100 upon entering a particular characteristic. The volumetric output VO$_i$ is the maximum volumetric output of adhesive that each of the pump assemblies 20a-20f is capable of, and is measured in cubic centimeters per minute (cc/min). Alternatively, the volumetric output VO$_i$ can be measured in cubic centimeters per revolution (cc/rev). The volumetric output VO$_i$ is a known value for each pump assembly 20 that can be preprogrammed into the memory unit 104 of the controller 100 before an adhesive dispensing operation begins. Conversely, the volumetric output VO$_i$ may also be a user defined variable that can be changed at any time by an operator of the applicator 10. In one embodiment, the pump assemblies 20a-20f are sized such that the volumetric output VO$_i$ is 0.3 cc/min. However, it is contemplated that the applicator 10 can accommodate pump assemblies of various sizes that have varied maximum volumetric outputs.

The dispensing module on time ratio MOT$_i$ is the percentage of time that the dispensing module 16 corresponding to the particular pump assembly 20 is in the open configuration. This is calculated by multiplying the module on time in seconds for a single dispensing pattern by the number of patterns dispensed by the dispensing module 16 in one minute, and dividing that amount by 60 seconds. By subtracting the dispensing module on time ratio MOT$_i$ from one, as shown in Equation 1, the effective result is the ratio of time the dispensing module 16 is in the closed configuration and thus directing adhesive to the recirculation channel 236. As a result, the dispensing on time ratio MOT$_i$ is the mathematical complement to ratio of time the dispensing module 16 is in the closed configuration. The dispensing module on time ratio MOT$_i$ can be determined by the controller 100 from the process-dependent characteristics chosen by the operator, or can be directly entered into the HMI device 108 by the operator.

After the total average recirculation flow rate is determined in step 306, in step 308 the controller 100 determines the recirculation pump speed required to pump the adhesive from the recirculation channel 236 to the supply channel 200. The required recirculation pump speed calculated in Equation 2 (shown below) represents the speed that the recirculation pump assembly 20g must operate at to pump the recirculated adhesive from the pump assemblies 20a-20f to the supply channel 200 without adversely affecting the desired pressure of adhesive being dispensed from the dispensing modules 16. The calculations performed according to Equation 2 are displayed below:

$$RPS = \left(\frac{TFR_{avg}}{RVO}\right) \qquad \text{Equation 2}$$

where
RPS=Required Recirculation Pump Speed (rev/min)
TFR$_{avg}$=Total Average Recirculation Flow Rate (cc/min)
RVO=Recirculation Pump Volumetric Output (cc/rev)
In this equation, the required recirculation pump speed RPS is calculated by dividing the total average recirculation flow rate TFR$_{avg}$ by the recirculation pump volumetric output RVO. As noted previously, the total average recirculation flow rate TFR$_{avg}$ can be determined using Equation 1. The recirculation pump volumetric output RVO is the maximum volumetric output that the recirculation pump assembly 20g is capable of, and is measured in cubic centimeters per revoluation (cc/rev). In one embodiment, the recirculation pump assembly 20g has a recirculation pump volumetric output of 4.0 cc/rev. However, the recirculation pump assembly 20g can be differently sized such that the recirculation pump volumetric output varies accordingly. The recirculation pump volumetric output RVO can be preprogrammed into the memory unit 104 of the controller, or can alternatively be entered into the HMI device 108 by the operator of the applicator 10.

In another embodiment, step 308 involves determining a required recirculation motor speed for the recirculation pump assembly 20g. This is performed by multiplying the required recirculation pump speed RPS by the gearbox reduction ratio of the recirculation pump assembly 20g. The gearbox reduction ratio refers to the size ratio between the driving gears of the motor assembly (not shown) and the driven gear of the pump assembly (not shown) in the recirculation pump assembly 20g, as is known in the art. In one embodiment, the gearbox reduction ratio of the recirculation pump assembly 20g is 23:1. However the driving and driven gears of the recirculation pump assembly 20g can be differently configured such that the gearbox reduction ratio varies.

Continuing with FIG. 9, upon determining the required recirculation pump speed RPS in step 308, the controller 100 can then in step 312 adjust the operating speed of the recirculation pump assembly 20g to match the required recirculation pump speed RPS. The step of adjusting the operating speed of the recirculation pump assembly 20g can be performed automatically by the controller 100. Alternatively, the HMI device 104 can display the required recirculation pump speed RPS on an output device, and the operator of the applicator 10 can manually adjust the operational speed of the recirculation pump assembly 20g using the controller 100 and/or the device 108 to match the required operating speed.

After the operational speed of the recirculation pump assembly 20g is adjusted to match the required recirculation pump speed RPS determined in step 308, the operational speed of the recirculation pump assembly 20g can be tuned in step 316. In step 316, the operational speed can be tuned such that the operational pump speed is higher or lower than the required recirculation pump speed RPS. As such, the operator can manually raise or lower the operational speed of the recirculation pump assembly 20g by entering adjustments into the HMI device 108, as desired. Alternatively, the controller 100 can perform this tuning step automatically according to a predefined program. This tuning step can be performed to account for pressure fluctuations that occur during normal operation of the applicator 10. For example, the steps of switching the dispensing module 16 between the open and closed configurations, particularly the resulting volumetric displacement that occurs when the valve stem 260 moves within the dispensing flow path 224, can create pressure fluctuations in the dispensing flow path 224 or pressure differentials between the supply channel 200 and the recirculation channel 236. This can lead to metering accuracy variation between the dispensing modules 16 or adhesive pattern deformation on the substrate. By raising or lowering the operational speed of the recirculation pump 20g relative to the required recirculation pump speed RPS, the operator of the applicator can attenuate the effects of these issues.

The use of the controller 100 and HMI device 108 to control the operation of a recirculation pump assembly 20g, particularly in the implementation of method 300, can simplify the overall construction of the applicator 10. By using the recirculation pump assembly 20g, the use of external recirculation hoses is no longer required. Further, by dynamically controlling the operational speed of the recirculation pump assembly 20g, the pressure of adhesive within the applicator 10 is constantly regulated to ensure a controllable and consistent flow rate of adhesive exiting the applicator 10, which ensures that a consistent adhesive pattern quality on a substrate is repeatedly produced. As a result, pattern deformations on the substrate, such as hammerhead, can be avoided.

Further, the use of the controller 100 and HMI device 108 allows an operator of the applicator 10 to continuously control and alter the operation of the recirculation pump assembly 20g. As a result, the operator can manually account for changes in the pump assemblies 20a-20f, a change in the recirculation pump assembly 20g, changes in the adhesive type, changes in the substrate type or dispensing operation, etc. Alternatively, the controller 100 can automatically account for such changes. Further, the operator has the ability to tune the speed of the recirculation pump assembly 20g and thus is not constrained by any predetermined modes or operations.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A system for controlling a recirculation pump assembly, the system comprising one or more processors and one or more storage devices in electrical communication with the recirculation pump assembly, the system being configured to:
   receive a process-dependent characteristic of an adhesive;
   determine a recirculation flow rate of the adhesive that flows to the recirculation pump assembly based on the process-dependent characteristic;
   determine, based on the recirculation flow rate of the adhesive, a desired recirculation pump speed of the recirculation pump assembly for pumping the adhesive to a supply channel that supplies the adhesive to one or more application pump assemblies separate from the recirculation pump assembly; and
   adjust an operating speed of the recirculation pump assembly to match the desired recirculation pump speed.

2. The system of claim 1, wherein the process-dependent characteristic includes a maximum pump speed for the one or more application pump assemblies, an instantaneous line speed, a maximum line speed, a pattern length, or patterns per minute in an application of the adhesive onto a substrate.

3. The system of claim 2, wherein the instantaneous line speed and the maximum line speed represent a number of substrates per minute or a distance between substrates per minute.

4. The system of claim 1, wherein the process-dependent characteristic includes a maximum flow rate of adhesive applied to substrates.

5. The system of claim 1, wherein the process-dependent characteristic includes product type, product skew, or adhesive type.

6. The system of claim 1, wherein the process-dependent characteristic includes descriptive characteristics that represent a unique adhesive dispensing operation, the system being further configured to: obtain numerical characteristics of the unique adhesive dispensing operation.

7. The system of claim 1, wherein the system is configured to receive the process-dependent characteristic from a user at a human-machine interface.

8. The system of claim 1, wherein the system is configured to determine the desired recirculation pump speed of the recirculation pump assembly by dividing the recirculation flow rate by a maximum volumetric output of the recirculation pump assembly.

9. The system of claim 1, wherein the system is further configured to determine a recirculation motor speed by multiplying the desired recirculation pump speed by a gearbox reduction ratio of the recirculation pump assembly.

10. The system of claim 1, wherein the system is further configured to tune the operating speed of the recirculation pump assembly.

11. The system of claim 10, wherein the system is further configured to automatically tune the operating speed of the recirculation pump assembly.

12. The system of claim 10, wherein the system is configured to tune the operating speed of the recirculation pump assembly by receiving adjustments to the operating speed of the recirculation pump assembly.

13. A storage device storing a computer program for controlling a recirculation pump assembly, the computer program comprising one or more code segments that, when executed, cause one or more processors to:
   receive a process-dependent characteristic of an adhesive;
   determine a recirculation flow rate of the adhesive that flows to the recirculation pump assembly based on the process-dependent characteristic;
   determine, based on the recirculation flow rate of the adhesive, a desired recirculation pump speed of the recirculation pump assembly for pumping the adhesive to a supply channel that supplies the adhesive to one or more application pump assemblies separate from the recirculation pump assembly; and
   adjust an operating speed of the recirculation pump assembly to match the desired recirculation pump speed.

14. The storage device of claim 13, wherein the process-dependent characteristic includes a maximum pump speed for the one or more application pump assemblies, an instantaneous line speed, a maximum line speed, a pattern length, or patterns per minute in an application of the adhesive onto a substrate.

15. The storage device of claim 13, wherein the process-dependent characteristic includes product type, product skew, or adhesive type.

16. The storage device of claim 13, wherein the computer program, when executed, is further configured to cause the one or more processors to tune the operating speed of the recirculation pump assembly.

17. The storage device of claim 13, wherein the process-dependent characteristic includes descriptive characteristics that represent a unique adhesive dispensing operation, the computer program, when executed, being further configured to cause the one or more processors to: obtain numerical characteristics of the unique adhesive dispensing operation.

18. The storage device of claim 13, wherein the computer program, when executed, is configured to cause the one or more processors to receive the process-dependent characteristic from a user at a human-machine interface.

19. The storage device of claim 13, wherein the computer program, when executed, is configured to cause the one or more processors to determine the desired recirculation pump speed of the recirculation pump assembly by dividing the recirculation flow rate by a maximum volumetric output of the recirculation pump assembly.

20. The storage device of claim 13, wherein the computer program, when executed, is further configured to cause the one or more processors to determine a recirculation motor speed by multiplying the desired recirculation pump speed by a gearbox reduction ratio of the recirculation pump assembly.

* * * * *